US007866623B2

(12) United States Patent
Lampman et al.

(10) Patent No.: US 7,866,623 B2
(45) Date of Patent: Jan. 11, 2011

(54) COMPUTER RETAIL DISPLAY STAND

(75) Inventors: Linda Lampman, San Diego, CA (US); Anthony Ian Lynas, Tustin, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 71 days.

(21) Appl. No.: 12/255,215

(22) Filed: Oct. 21, 2008

(65) Prior Publication Data

US 2010/0096517 A1 Apr. 22, 2010

(51) Int. Cl.
*F16M 13/00* (2006.01)

(52) U.S. Cl. ............... 248/551; 248/186.2; 248/222.52; 248/282.1; 248/349.1; 70/58

(58) Field of Classification Search .............. 248/125.7, 248/130, 131, 176.1, 186.1, 186.2, 188.1, 248/220.21, 222.52, 282.1, 346.1, 349.1, 248/346.01, 551, 552; 70/58, 57.1, 57, 62, 70/14; 108/103, 59
See application file for complete search history.

(56) References Cited

U.S. PATENT DOCUMENTS 4,580,754 A * 4/1986 Hughes ...................... 248/323
5,044,589 A * 9/1991 Milne et al. ................. 248/265
6,006,904 A * 12/1999 Jacobsen ................. 206/315.6
6,402,111 B1 * 6/2002 Stewart et al. .............. 248/317
7,007,912 B1 * 3/2006 Giuliani et al. ............. 248/552
7,032,872 B2 * 4/2006 Sullivan ................ 248/346.07
7,370,840 B1 5/2008 Deconinck
7,658,363 B2 * 2/2010 Meyer ........................ 248/551
2003/0034429 A1 * 2/2003 Carnevali ............... 248/346.07
2005/0015262 A1 1/2005 Grundstrom et al.
2005/0274852 A1 12/2005 Saez et al.
2006/0291156 A1 12/2006 Allen
2008/0034551 A1 * 2/2008 Jeong .......................... 16/367
2010/0050706 A1 * 3/2010 O'Neill ......................... 70/58

FOREIGN PATENT DOCUMENTS

WO WO 03/001320 1/2003

OTHER PUBLICATIONS

Ergo in Demand, "Laptop Stands—Laptop Docking Stand—With Integrated 2.0 USB Hub" http://www.ergoindemand.com/laptop-stands-coking-stand.htm.
Aution.ph, "Notebook Holder laptop cooler inclined rotate 360*" http://listings.auction.ph/Computers+Accessories/Laptop/Notebook+Holder+laptop+cooler+inclined+rotate +360+/id-11281869.
Ergo in Demand "The Swivel Laptop Stand—the Notebook Stand that's Ergonomic" http://www.ergoindemand.com/laptop_stand.htm.

* cited by examiner

*Primary Examiner*—Terrell McKinnon
*Assistant Examiner*—Todd M. Epps
(74) *Attorney, Agent, or Firm*—John L. Rogitz

(57) ABSTRACT

A computer retail display stand includes a base with an adjustable rear locking bracket assembly that can be engaged with an in-store locking bar, adjusted as necessary for the particular configuration of the in-store locking bar. A support platen on which a computer can be disposed for display is rotatingly coupled to the base. Informational material can be supported on a brochure tray that slides into and out of the base at the front of the stand.

17 Claims, 6 Drawing Sheets

COMPUTER RETAIL DISPLAY STAND

FIELD OF THE INVENTION

The present invention relates generally to computer retail display stands.

BACKGROUND OF THE INVENTION

Foldable computers such as laptop computers typically are displayed in retail outlets by placing the computers on shelves and lifting the screen up from the keyboard portion for viewing by potential buyers. For security, the shelves typically have a row of horizontal bars with a pivot end and a free end, and a bar can be pivoted away from a housed position to permit an open computer to be placed on the shelf and then pivoted back to the housed position to lay across the hinge of the computer. The free end of the bar is then locked in the housed position so that the computer cannot be removed from the shelf.

As understood herein, it would be advantageous to provide a computer stand on a retail shelf to facilitate, among other things, a convenient platform on which informational brochures can be placed close to a computer that is positioned on the stand, and to facilitate rotating the stand with computer as a user might desire for better viewing. As also understood herein, such a stand should provide a means for locking both the computer to the stand and the stand to the existing shelf. As still further understood herein, different retail outlets may use different bar-shelf spacings, complicating the provisioning of such a stand.

SUMMARY OF THE INVENTION

A computer retail display stand includes a base and an adjustable rear locking bracket assembly coupled to the base and engageable with an in-store locking bar. The rear locking bracket assembly can be adjusted as necessary for accommodating plural in-store locking bar configurations. A support platen on which a computer can be disposed for display is swivably coupled to the base.

In some embodiments a brochure tray can be provided that slides into and out of the base at a front of the stand. Informational material is supported on the tray.

In example embodiments the platen is biased to a neutral position wherein edges of the platen are aligned with and slightly spaced vertically above edges of the base. The platen can be movable by hand to a rotated position.

If desired, the support platen can bear left and right brackets that impede left and right motion of a computer on the platen. The platen may also bear one or more front brackets which impede forward motion of a computer on the platen. A back bracket can also be provided for impeding rearward motion of a computer on the platen. The back bracket is removably engageable with the platen to permit a computer to be slid onto the platen between the front, left, and right brackets when the back bracket is disengaged with the platen.

In example embodiments, the rear locking bracket assembly includes a J-shaped bracket a three-sided bight of which can receive the locking bar. A closure bracket is removably engageable with the J-shaped bracket to trap the bar in the bight. The closure bracket can be formed with elongated left and right generally vertically oriented fastener slots through which respective fasteners can be disposed for engagement with respective female receptacles in the J-shaped bracket.

In another aspect, a method for displaying a computer includes providing a stand on which to support the computer, and engaging a locking bracket of the stand with an in-store security bar. The method further includes engaging a closure bracket with the locking bracket to hold the bar between the locking bracket and closure bracket. The computer can then be slid between left, right, and front security brackets of the stand that impede motion of the computer on the stand beyond the brackets. The method then includes engaging a back security bracket with the stand to prevent removing the computer past the back security bracket, with at least one of the security brackets also preventing lifting the computer from the stand.

In another aspect, a computer stand includes a base disposable on a shelf of a store, with the shelf being associated with a locking bar. Means are provided for releasably engaging the base with the bar. A support platen is coupled to the base. The support platen is configured to hold a computer for display. Means are provided for releasably holding the computer onto the support platen.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
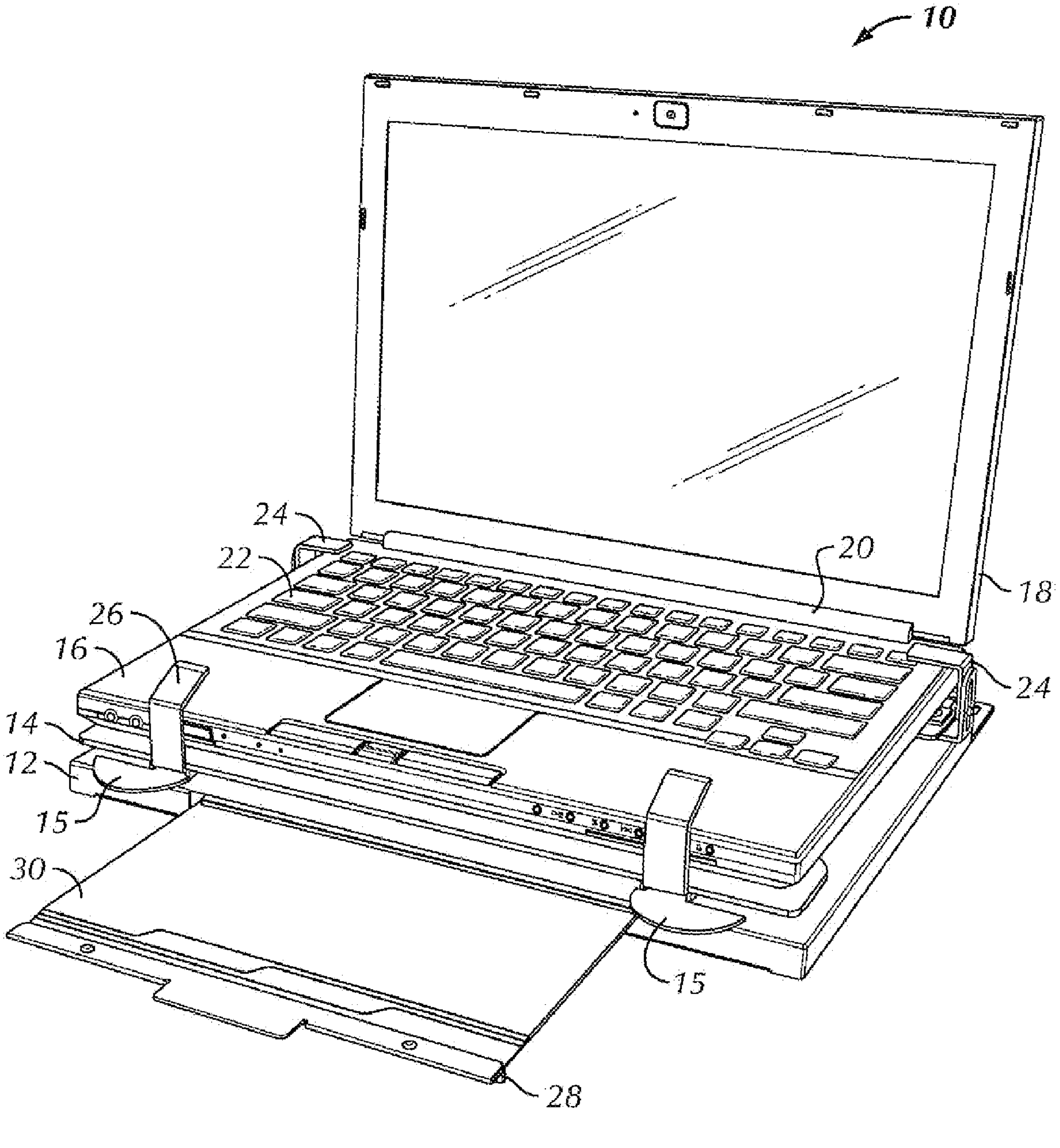
FIG. 1 is a perspective view of the computer display stand showing a computer on the stand and the support platen in the neutral position, with the brochure tray in the extended position.
Figure 2:
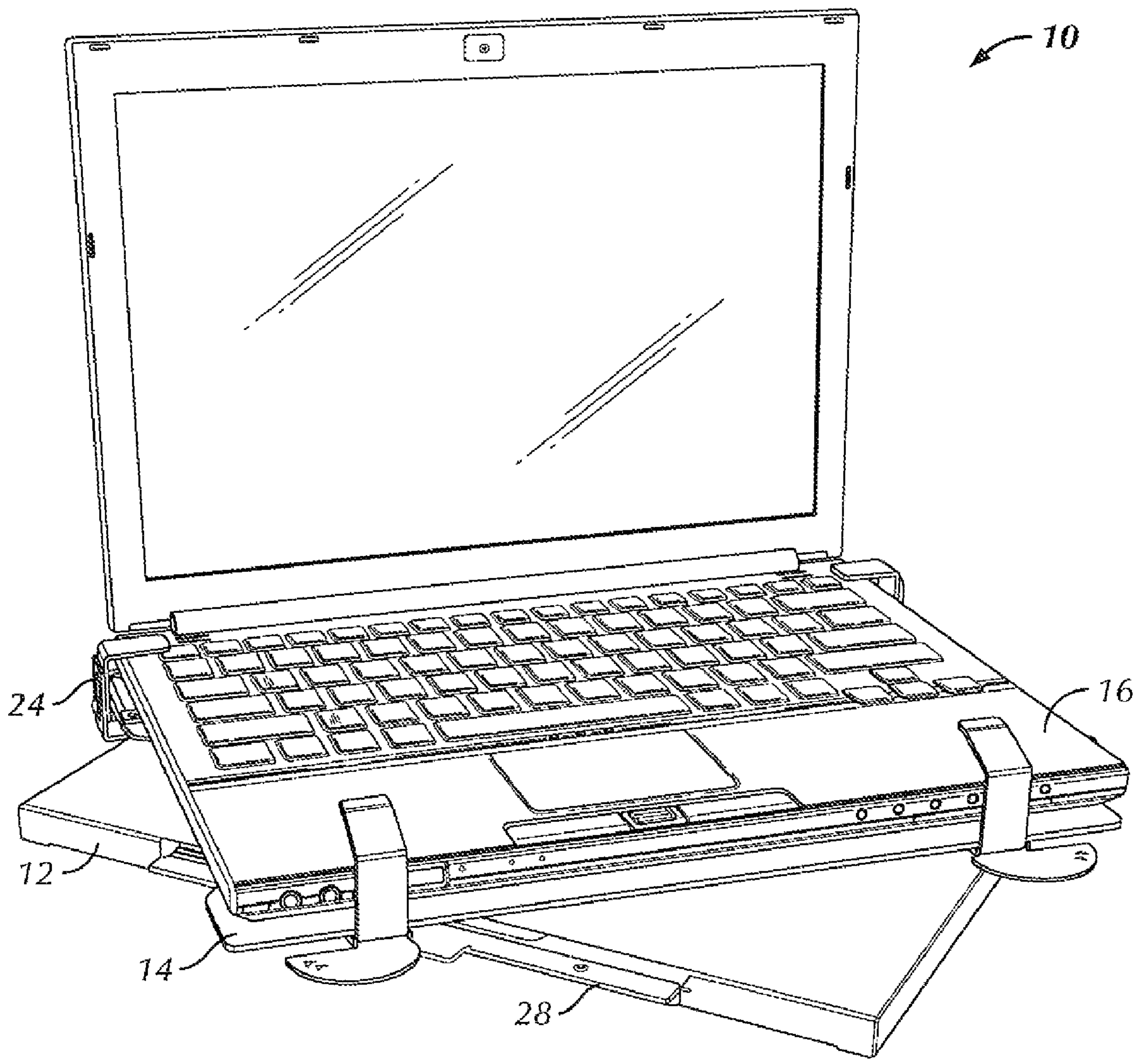
FIG. 2 is a perspective view of the computer display stand showing a computer on the stand and the support platen in a rotated position, with the brochure tray in the housed position.

Referring initially to FIGS. 1 and 2, a computer stand 10 is shown with a lower base 12 that is stationarily positioned on a retail outlet shelf and a support platen 14 that is rotatably coupled to the base 12. The support platen 14 can be swivelled by hand between a neutral position shown in FIG. 1, wherein the edges of the platen 14 are aligned with and slightly spaced vertically above the edges of the base 12, and a rotated position shown in FIG. 2, wherein the platen 14 has been swivelled with respect to the base 12 substantially about its center point as shown. The platen 14 preferably can be swivelled both clockwise and counterclockwise and can be biased as more fully disclosed below to the neutral position.

As shown in FIG. 1, left and right rotate tabs 15 may be provided on the front part of the platen 14 and may bear the indicia "rotate" so that a potential buyer knows that the tabs 15 may be grasped and the platen with computer rotated. Both the base 12 and platen 14 may be flat pieces of lightweight metal or plastic and one or both may be rectilinear in shape or may be other suitable shape.

A foldable computer 16 is positionable on the support platen 14. In the example shown, the computer 16 is a laptop computer that has a monitor portion 18 which can be folded about a hinge 20 toward and away from a keyboard portion 22.

As can be appreciated in reference to FIG. 1, the computer 16 may be opened and then engaged with the stand 10 by sliding the front edge of the keyboard portion 22 between left and right rear L-shaped or U-shaped brackets 24 of the support platen 14. The computer is advanced toward the front edge of the platen 14 until it abuts left and right front L-shaped or U-shaped brackets 26 of the support platen 14. Thus, each rear bracket 24 opens toward the opposite edge of the support platen 14 so that the rear brackets in effect open toward each other, while both front brackets 26 open toward the rear edge of the support platen 14.

FIGS. 1 and 2 show that a brochure tray 28 may be slidably engaged with the base 12 for motion from an extended position (FIG. 1), in which the front edge of the brochure tray 28 is positioned forward of the front edge of the base 12, and a housed position (FIG. 2), in which the brochure tray 28 is substantially housed in the base 12. The brochure tray may support a multi-page informational brochure 30 of relatively stiff display pages showing various features of the computer 16. As shown best in FIG. 3, in example embodiments the pages of the brochure 30 may be flipped up to reveal lower informational pages of the brochure 30.

Figure 4:
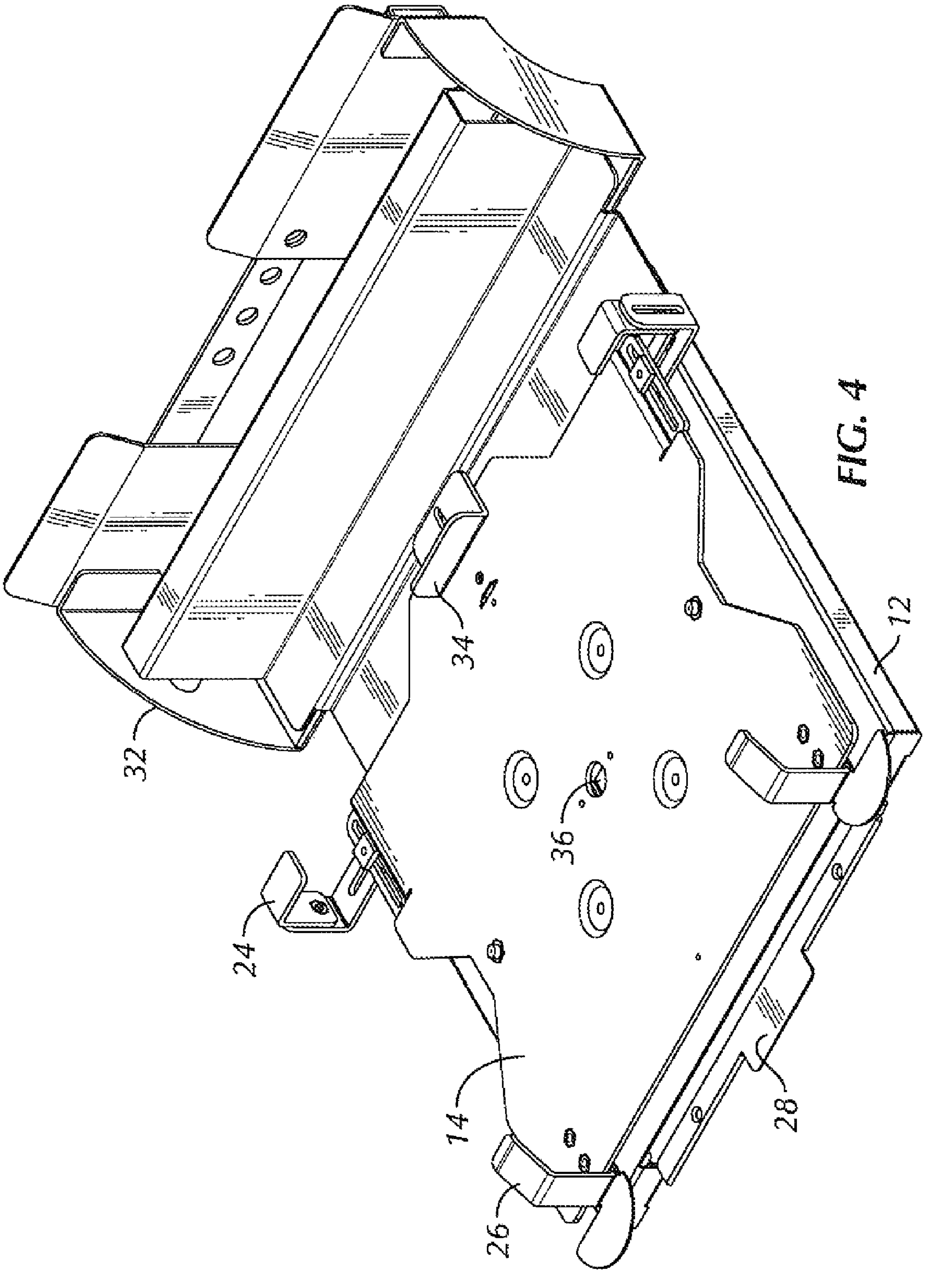
FIG. 4 is a perspective view looking at the top of the display stand with the computer removed.
Figure 5:
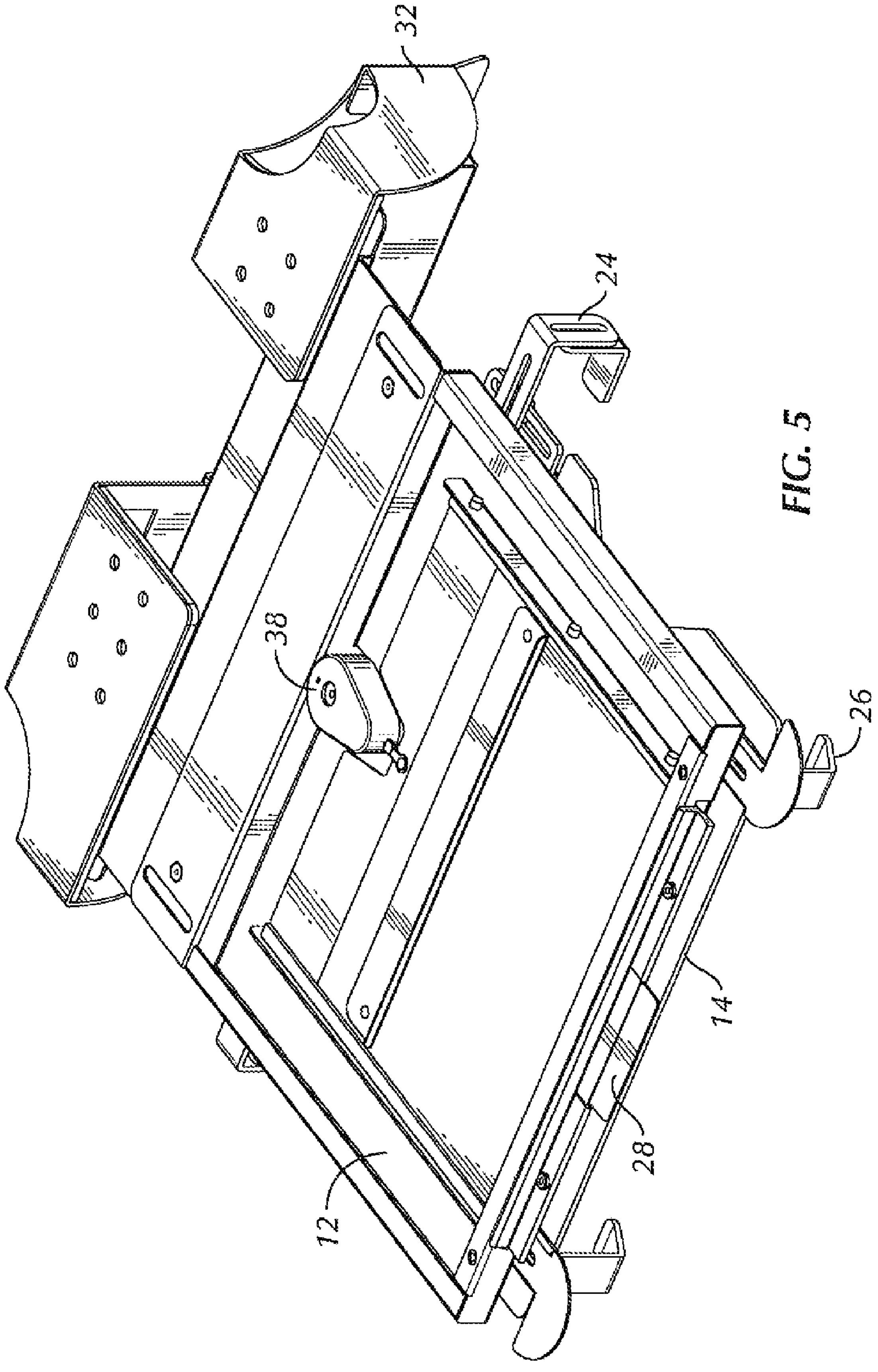
FIG. 5 is a perspective view looking at the bottom of the display stand with the computer removed.

FIGS. 4 and 5 show additional details of the stand 10 from the top (FIG. 4) and bottom (FIG. 5). As shown, the rear of the base 12 is coupled to a store shelf rear enclosure 32 so that the stand 10 cannot easily be removed from the shelf 32 by unauthorized people. Details of an example coupling are described further below.

Figure 3:
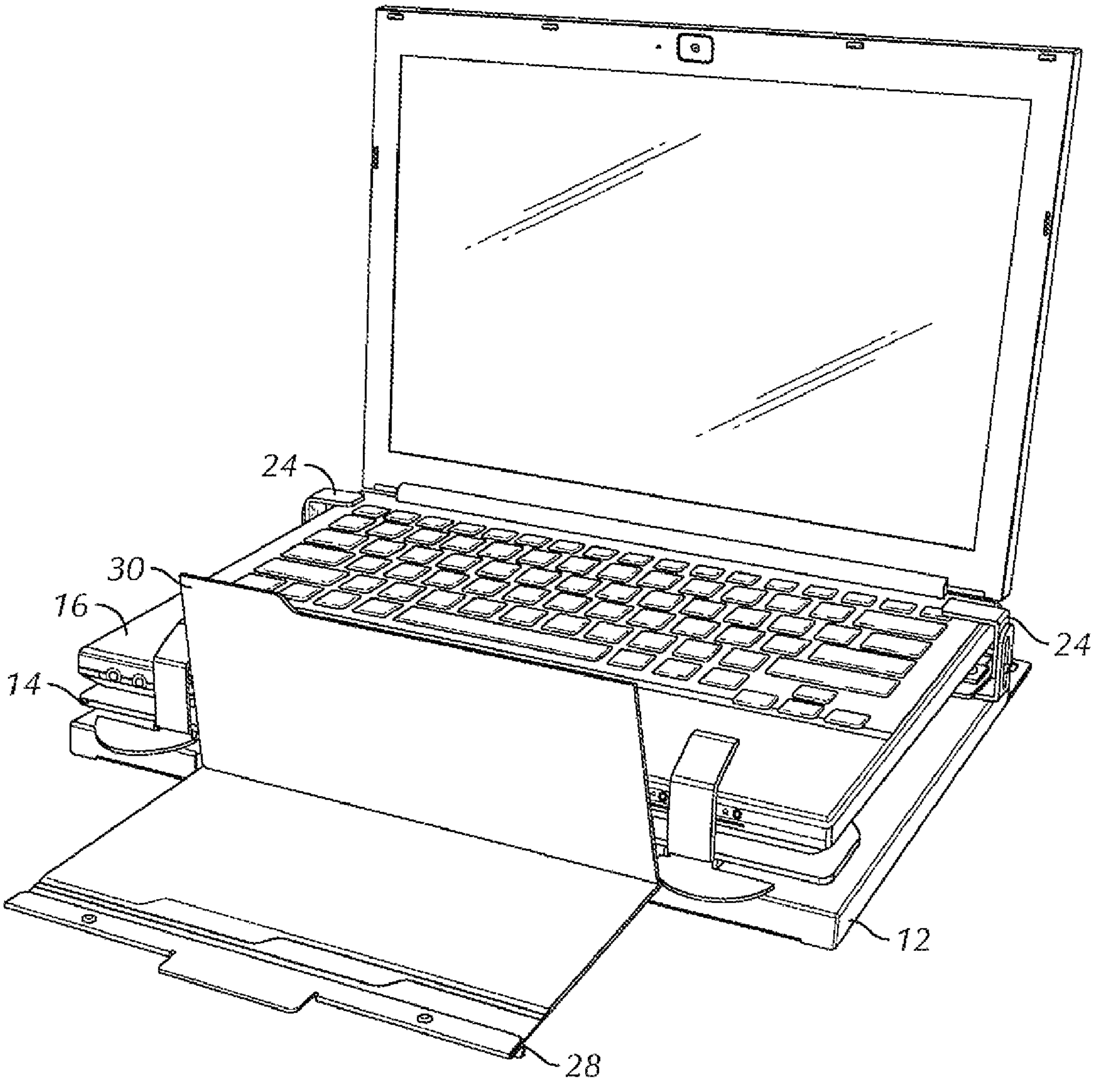
FIG. 3 is a perspective view of the computer display stand showing a computer on the stand and the support platen in the neutral position, with the brochure tray in the extended position and with a part of the brochure flipped up to expose a lower informational page.

As shown in FIG. 4, once the computer 16 in FIGS. 1-3 is positioned on the support platen 14, a back bracket 34 may be engaged by, e.g., threaded connectors with the platen 14 substantially at or about the middle of the rear edge of the platen 14. It may now be appreciated that with the back bracket 34 installed, the computer 16 cannot be removed from the support platen 14 by sliding it rearwardly, since such motion is impeded by the back bracket 34. Nor can the computer 16 be removed from the platen 14 by sliding it left or right because the left and right rear brackets 24 prevent such removal, and likewise the left and right front brackets 26 prevent removing the computer 16 by sliding it forward off the support platen 14. Both the rear and front brackets 24, 26 prevent the computer 16 from being lifted up and away from the support platen 14. Thus, once the back bracket 34 is engaged with the support platen 14 with the computer 16 disposed between the brackets 24, 26, 34, the computer 16 cannot easily be removed from the platen 14.

FIG. 4 also shows that the platen 14 is formed with a center hole 36 that is coupled to a rotatable device such as a "lazy Susan" device located between the platen 14 and base 12, as more fully described below. As shown in FIG. 5, an appropriate electrical connector 38 may be provided on the base 12 for the computer 16. For example, the electrical connector 38 may be implemented by a telephone pull box.

Figure 6:
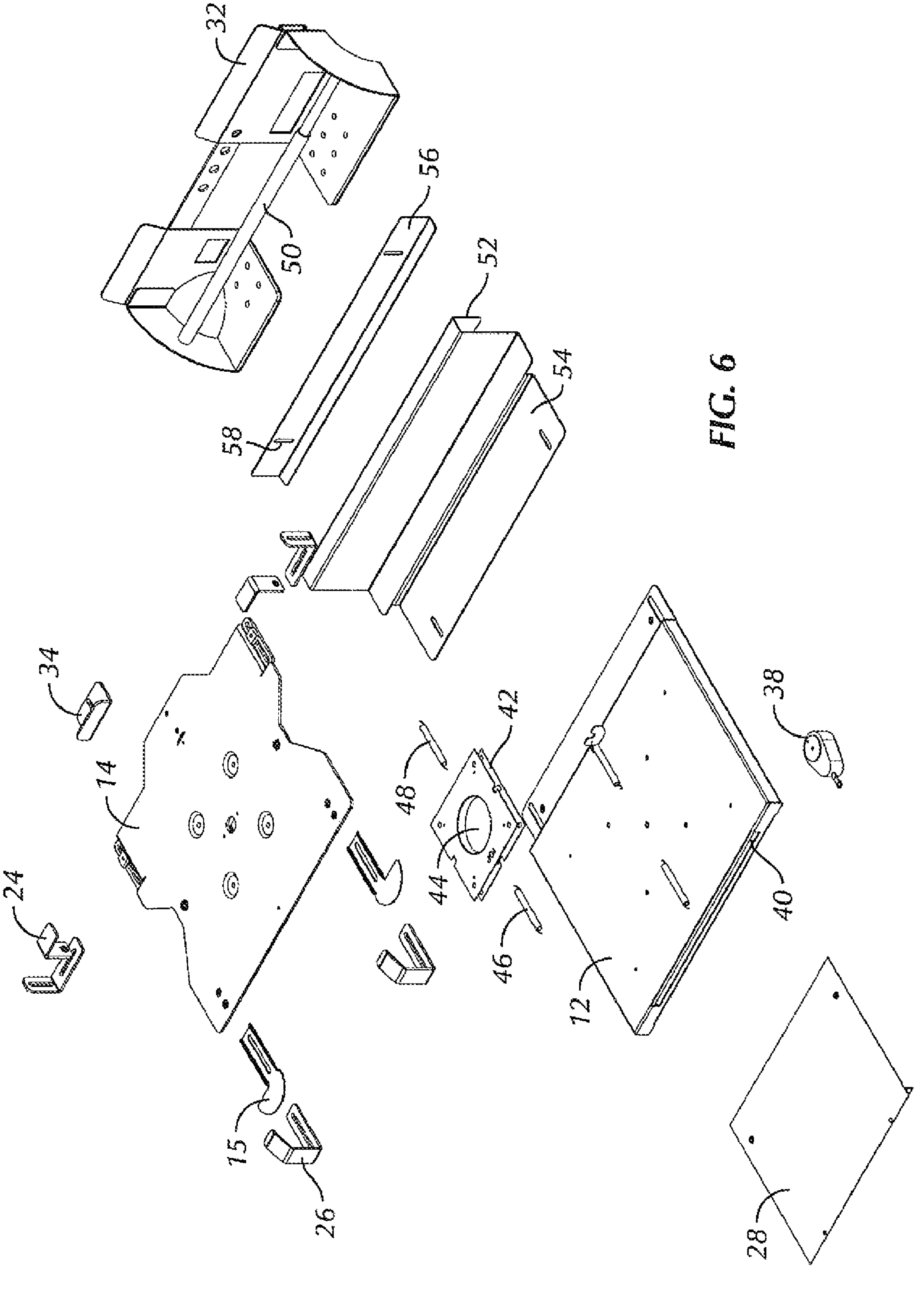
FIG. 6 is an exploded perspective view showing various parts of the stand.

FIG. 6 shows details of an example non-limiting implementation. The brochure tray 28 may be slidably engaged with a flat thin cavity 40 of the base 12 as shown, with the cavity 40 extending into the base 12 from the front edge thereof. A "lazy Susan" plate 42 with central axle hole 44 may be disposed between the platen 14 and base 14 and may be coupled to both by an axle (not shown) to provide for rotatable motion of the platen 14 with respect to the base 12. Front and rear compression springs 46, 48 may be disposed between the front and rear edges, respectively, of the plate 42 and appropriate structure in the stand 10 to bias the platen 14 to the neutral position shown in FIG. 1.

As mentioned above, the base 12 is coupled to the shelf 32. FIG. 6 shows an example non-limiting way to accomplish this using structure that advantageously can be adjustable as necessary to accommodate plural in-store locking bar configurations.

With more specificity, a rear locking bracket assembly may be secured to the base 12 and to the in-store locking bar 50 that is typically provided on the shelf 32. In the embodiment shown, the rear locking bracket assembly includes a J-shaped bracket 52 the three-sided bight of which can receive the locking bar 50. If desired, the J-shaped bracket 52 may be formed integrally with a flat securing bracket 54 that extends forward from the bottom edge of the long arm of the "J" as shown to mate flush with the base 12, to which the securing bracket 54 can be secured by, e.g., threaded fasteners.

The example rear locking bracket assembly also includes a closure bracket 56 that may be L-shaped as shown. With the in-store bar 50 in the bight of the J-shaped bracket 52, the closure bracket 56 may be positioned to trap the bar 50 in the bight. The closure bracket 56 is then secured to the J-shaped bracket 52 using threaded fasteners. In this way, the base 12 is secured to the shelf 32 to in turn secure the support platen 14, on which the computer 16 is securely held, to the shelf.

In the embodiment shown, the closure bracket 56 is formed with elongated left and right generally vertically oriented fastener slots 58 through which respective fasteners are disposed for engagement with respective female receptacles in the J-shaped bracket 52. The closure bracket 56 thus is vertically adjustable relative to the J-shaped bracket 52 to accommodate various in-store bar 50 configurations. When the appropriate height of the closure bracket 56 relative to the J-shaped bracket 52 has been established, the fasteners are tightened to secure the rear locking assembly on the in-store bar 50.

While the particular COMPUTER RETAIL DISPLAY STAND is herein shown and described in detail, it is to be understood that the subject matter which is encompassed by the present: invention is limited only by the claims.

What is claimed is:

1. A computer retail display stand for holding a computer on a shelf in a retail in view of potential purchasers of the computer, the computer retail display stand comprising:

a base;

an adjustable rear locking bracket assembly coupled to the base and engageable with an in-store locking bar, the rear locking bracket assembly being adjustable as necessary for accommodating plural in-store locking bar configurations; and a support platen on which a computer can be disposed for display, the platen being swivably coupled to the base, wherein the platen is biased to a neutral position wherein edges of the platen are aligned with and slightly spaced vertically above edges of the base, the platen being movable by hand to a rotated position.

2. The stand of claim 1, comprising a brochure tray that slides into and out of the base at a front of the stand, informational material being supportable on the tray.

3. The stand of claim 1, wherein the support platen bears left and right brackets impeding left and right motion of a computer on the platen, the platen also bearing at least one front bracket impeding forward motion of a computer on the platen.

4. The stand of claim 3, wherein the platen further bears a back bracket impeding rearward motion of a computer on the platen, the back bracket being removably engageable with the platen to permit a computer to be slid onto the platen between the front, left, and right brackets when the back bracket is disengaged with the platen.

5. The stand of claim 1, wherein the rear locking bracket assembly includes a J-shaped bracket a three-sided bight of which can receive the locking bar and a closure bracket removably engageable with the J-shaped bracket to trap the bar in the bight.

6. The stand of claim 5, wherein the closure bracket is formed with elongated left and right generally vertically oriented fastener slots through which respective fasteners can be disposed for engagement with respective female receptacles in the J-shaped bracket.

7. Computer stand, comprising:

a base disposable on a shelf of a store for coupling a computer to the shelf for display of the computer on the shelf, the shelf being associated with a locking bar;

means for releasably engaging the base with the bar, the means for relaseably engaging comprising a bracket defining a three-sided bight receiving a store locking bar;

a support platen coupled to the base, the support platen configured to hold a computer for display; and means for releasably holding the computer onto the support platen.

8. Computer stand of claim 7, wherein the support platen is swivably coupled to the base.

9. Computer stand of claim 7, wherein the means for releasably engaging accommodates plural bar configurations.

10. Computer stand of claim 7, wherein the means for releasably holding includes plural brackets impeding left, right, back, forward, and upward motion of a computer on the stand.

11. Computer stand of claim 7, comprising a brochure tray slidably engaged with the base.

12. A computer retail display stand for holding a computer in a store to display the computer to potential buyers in the store, comprising:

a base;

an adjustable rear locking bracket assembly coupled to the base and engageable with an in-store locking bar; and a support platen on which a computer can be disposed for display, the platen being swivably coupled to the base at the center of the platen such that when the platen swivels the center of the platen does not move translationally relative to the base, the platen and base defining respective major surface planes that are parallel to each other.

13. The stand of claim 12, comprising a brochure tray that slides into and out of the base at a front of the stand, informational material being supportable on the tray.

14. The stand of claim 12, wherein the platen is biased to a neutral position wherein edges of the platen are aligned with and slightly spaced vertically above edges of the base, the platen being movable by hand to a rotated position.

15. The stand of claim 12, wherein the support platen bears left and right brackets impeding left and right motion of a computer on the platen, the platen also bearing at least one front bracket impeding forward motion of a computer on the platen.

16. The stand of claim 15, wherein the platen further bears a back bracket impeding rearward motion of a computer on the platen, the back bracket being removably engageable with the platen to permit a computer to be slid onto the platen between the front, left, and right brackets when the back bracket is disengaged with the platen.

17. The stand of claim 12, wherein the rear locking bracket assembly includes a J-shaped bracket a three-sided bight of which can receive the locking bar and a closure bracket removably engageable with the J-shaped bracket to trap the bar in the bight.

* * * * *